(12) United States Patent
Kisoda et al.

(10) Patent No.: US 7,625,260 B2
(45) Date of Patent: Dec. 1, 2009

(54) METHOD OF SEALING GLASS PANEL ASSEMBLY AND SEALING PROCESS FURNACE

(75) Inventors: Kinya Kisoda, Osaka (JP); Tadashi Seki, Osaka (JP)

(73) Assignee: Chugai Ro Co., Ltd. (JP)

( * ) Notice: Subject to any disclaimer, the term of this patent is extended or adjusted under 35 U.S.C. 154(b) by 352 days.

(21) Appl. No.: 10/589,914

(22) PCT Filed: Feb. 14, 2005

(86) PCT No.: PCT/JP2005/002145

§ 371 (c)(1),
(2), (4) Date: Aug. 18, 2006

(87) PCT Pub. No.: WO2005/080286

PCT Pub. Date: Sep. 1, 2005

(65) Prior Publication Data

US 2007/0161315 A1 Jul. 12, 2007

(30) Foreign Application Priority Data

Feb. 20, 2004 (JP) ............................... 2004-045513

(51) Int. Cl.
*H01J 9/00* (2006.01)
*H01J 9/38* (2006.01)
(52) U.S. Cl. .............................. 445/24; 445/25; 445/38; 445/39; 445/40
(58) Field of Classification Search ............. 445/24–25, 445/5–6, 38, 40–42, 59
See application file for complete search history.

(56) References Cited

U.S. PATENT DOCUMENTS

| 5,788,551 A | 8/1998 | Dynka et al. |
| 2001/0034175 A1 | 10/2001 | Miyazaki et al. |
| 2002/0111103 A1 | 8/2002 | Konishi et al. |

FOREIGN PATENT DOCUMENTS

| CN | 1312536 | 9/2001 |
| EP | 1 220 269 A1 | 7/2002 |
| FR | 2 767 813 A1 | 3/1999 |
| FR | 2767813 | 3/1999 |
| GB | 2 029 084 A | 3/1980 |

(Continued)

*Primary Examiner*—Nimeshkumar D. Patel
*Assistant Examiner*—Anne M Hines
(74) *Attorney, Agent, or Firm*—DLA Piper LLP (US)

(57) ABSTRACT

A glass panel assembly sealing method and sealing process furnace used therewith wherein coordinated control of temperature and pressure enables the removal of impure gas and the like from the glass panel assembly and reduces the amount of residual impure gas and the like remaining in the glass panel assembly after the sealing process is complete. A seal frit is applied between two mutually overlaid glass substrates comprising a glass panel assembly. The internal temperature of the glass panel assembly is raised, through a forcefully circulated environment, to a preliminary temperature T1 which is near the initial melting temperature of the seal frit. The pressure (P1) of the internal environment is then reduced while the preliminary temperature is maintained. The temperature is then increased from the preliminary temperature up to the sealing temperature T2 by the forcefully circulated environment, after which the glass panel assembly is cooled by the forceful circulated environment.

2 Claims, 2 Drawing Sheets

FOREIGN PATENT DOCUMENTS

| | | |
|---|---|---|
| JP | 06-036688 | 2/1994 |
| JP | 09-171768 | 6/1997 |
| JP | 11-037660 | 2/1999 |
| JP | 2001-351525 | 12/2001 |
| JP | 2002-181457 | 6/2002 |
| TW | 367523 | 8/1999 |
| TW | 448284 | 8/2001 |
| WO | 96/15542 A | 5/1996 |
| WO | WO 99/66525 A1 | 12/1999 |

METHOD OF SEALING GLASS PANEL ASSEMBLY AND SEALING PROCESS FURNACE

RELATED APPLICATION

This is a §371 of International Application No. PCT/JP2005/002145, with an international filing date of Feb. 14, 2005 (WO 2005/080286 A1, published Sep. 1, 2005), which is based on Japanese Patent Application No. 2004-045513, filed Feb. 20, 2004.

TECHNICAL FIELD

The invention relates to a sealing method applied to a glass panel assembly and a structure for the furnace used with this method wherein impure gas and the like may be removed from the glass panel assembly during the sealing process in the furnace by means of coordinated control of temperature and pressure, whereby the volume of impure gas remaining in the glass panel assembly is reduced after the sealing process has been completed.

BACKGROUND

The plasma display panel (PDP) manufacturing process includes a preliminary baking step where a seal frit is applied between two glass substrates which are provided with electrodes, inductive components, fluorescent components and partition walls or other like structures; and a seal-forming process step wherein a seal is formed between the glass substrates through the seal frit.

To explain further, in the preliminary baking process, a seal frit, which is a sealing material consists of a soft glass or other like substance, is applied to one of the glass substrates after which the substrate is subjected to a preliminary baking process in a preliminary baking oven. The other glass substrate is then placed over the seal frit of the previously preliminarily baked substrate, and a clamp or other like fixture is applied to bind the two substrates together to form a glass panel assembly within which the previously noted partition walls and other like structures are sandwiched. In the subsequent sealing process, the glass panel assembly is placed into a sealing oven, and is heated to and maintained at the sealing temperature during the adequate time. The sealing temperature is a temperature higher than that at which the seal frit melts, to form a seal between the glass substrates through the seal frit. After sealing, the glass panel assembly is cooled and subjected to an internal atmosphere evacuation process after which a light emitting gas is injected thereto to form the finished plasma display panel.

Japanese Unexamined Patent Publication Nos. H6-36688 and H11-37660 disclose manufacturing equipment and sealing ovens used to seal the glass panel assembly after the preliminary baking process. Upper and lower heaters, or an inductive heater are used. While the sealing processes described by these document provide for specific temperature control within the oven, there is no specific control of the pressure within the oven and ancillary equipment.

Heating a seal frit results in the emission of impure gas which can have an adverse effect on the performance of a plasma display panel. To prevent the impure gas from invading the glass panel assembly during the sealing process, the seal frit is subjected to preliminary baking, before the sealing process, to remove impure gas from the seal frit.

Although the preliminary baking, which is executed before the sealing process, has the effect of removing impure gas, raising the temperature of the seal frit again to the sealing temperature during the sealing process, and maintaining that temperature for a specific period of time, results in cracked gas and other types of impure gas adhering to the irregular surface and/or porous of the seal frit. This residual impure gas eventually escapes into the area between the glass substrates. Moreover, the problem is not limited to not only the escape of residual impure gas from the seal frit and also the escape of air and gas from other baked materials, such as the partition walls, from the glass panel assembly. If there is a significant volume of impure gas remaining within the glass panel assembly, additional time is required to execute a subsequent gas removal process. Also, the repeated release of impure gas within the completed plasma display panel results in degraded light emission characteristics.

SUMMARY

This invention relates to a method of sealing a glass panel assembly by melting a seal frit which is applied between two mutually overlaid glass substrates, including a preliminary heat process where temperature of the glass panel assembly is increased to a preliminary temperature within a forced flow of a heating medium, the preliminary temperature being lower than a temperature at which the seal frit begins to melt, a pressure reduction process where pressure surrounding the glass panel assembly is reduced while the preliminary temperature is maintained, a sealing process where temperature of the glass panel assembly is raised from the preliminary temperature to a sealing process temperature within a forced flow of a heating medium, and a cooling process where the glass panel assembly is cooled within a forced flow of a cooling medium.

This invention also relates to a glass panel assembly sealing process furnace incorporating a transport mechanism as means of transporting a glass panel assembly therethrough and melting a seal frit which is applied between two mutually overlaid glass substrates of said glass panel assembly, including a preliminary heating portion, a pressure reduction portion, a sealing treatment portion and a cooling portion sequentially disposed along a transport direction of the glass panel assembly by the transport mechanism, and pressure adjustment portions capable of increasing and decreasing pressure, installed between the preliminary heating portion and the pressure reduction portion, and also between the pressure reduction portion and the sealing treatment portion, wherein the preliminary heating portion heats the glass panel assembly with a forced flow of a heating medium to a preliminary temperature, the preliminary temperature being lower than a temperature at which the seal frit begins to melt, the pressure reduction portion decreases pressure surrounding the glass panel assembly and maintains the preliminary temperature, the sealing treatment portion heats the glass panel assembly with a forced flow of a heating medium to a sealing process temperature from the preliminary temperature, and the cooling portion cools the glass panel assembly with a forced flow of a cooling medium.

DETAILED DESCRIPTION

Figure 1:
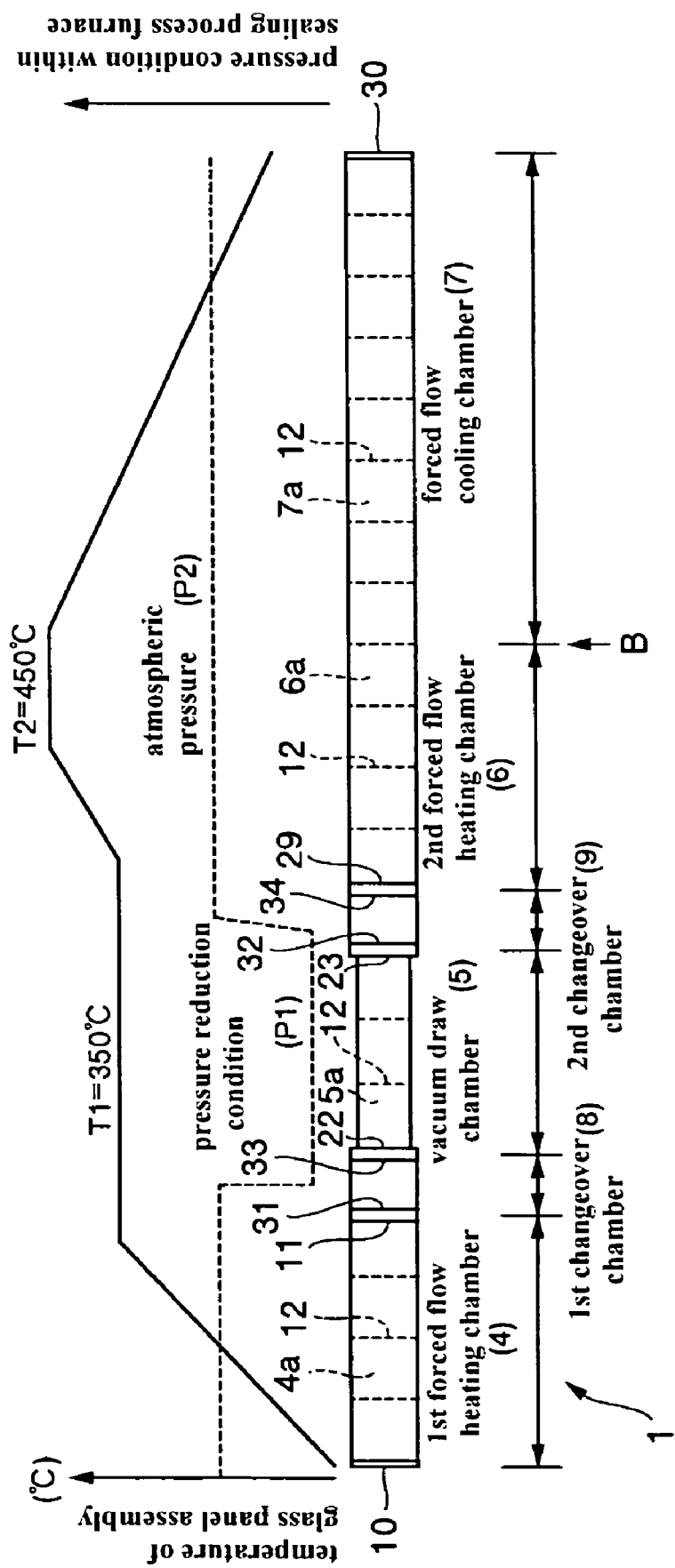
FIG. 1 is a block diagram of the glass panel assembly sealing method and furnace used therewith showing the sealing process furnace with the temperature and pressure control parameters applied to the method.

We provide a sealing method applied to a glass panel assembly and a structure for the furnace used in this method. The glass panel assembly sealing method and sealing process furnace used therewith enables the removal of impure gas and the like from the glass panel assembly by means of coordinated control of temperature and pressure during the sealing process, and has the effect of further reducing the volume of impure gas remaining in the glass panel assembly after completion of the sealing process.

The glass panel assembly sealing method includes a preliminary heat process, a pressure reduction process, a sealing process and a cooling process. The preliminary heat process raises the temperature of the glass panel assembly, which consists of two glass substrates between which a seal frit has been applied, within a forced flow of a heating medium at a preliminary temperature which is lower than the temperature at which the seal frit begins to melt. The pressure reduction process reduces the pressure surrounding the glass panel assembly while the preliminary temperature is maintained. The sealing process increases the temperature of the glass panel assembly from the preliminary temperature to a sealing process temperature within a forced flow of a heating medium. The cooling process decreases the temperature of the glass panel assembly within a forced flow of a cooling medium.

The glass panel assembly sealing process incorporates a transport mechanism as a means of transporting a glass panel assembly therethrough and melting a seal frit which is applied between two mutually overlaid glass substrates of the glass panel assembly, and includes a preliminary heating part, a pressure reduction part, a sealing treatment part and a cooling part sequentially disposed along a transport direction of the glass panel assembly by the transport mechanism, and pressure adjustment parts. The preliminary heating part heats the glass panel assembly by a forced flow of a heating medium to the preliminary temperature. The pressure reduction part decreases the pressure surrounding the glass panel assembly and maintains the preliminary temperature. The sealing treatment part heats the glass panel assembly by a forced flow of a heating medium to the sealing process temperature from the preliminary temperature. The cooling part cools the glass panel assembly by a forced flow of a cooling medium. The pressure adjustment parts, which are capable of increasing and decreasing pressure, are installed between the preliminary heating part and the pressure reduction part, and also between the pressure reduction part and the sealing treatment part.

The glass panel assembly sealing method and sealing process furnace used therewith enables, during the sealing treatment step, the desired removal of impure gas and the like from the glass panel assembly by means of coordinated control of temperature and pressure, and thus reduces the amount of residual impure gas and the like within the glass panel assembly after the sealing process has been completed.

Figure 2:
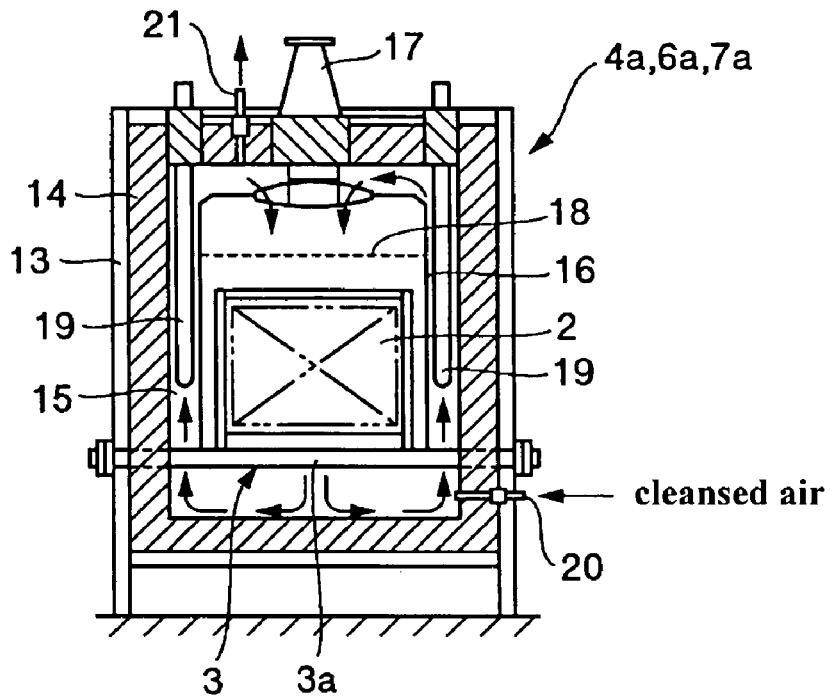
FIG. 2 is a cross section of the $1^{st}$ and $2^{nd}$ forced flow heating chambers and forced flow cooling chamber of the sealing process furnace shown in FIG. 1.
Figure 3:
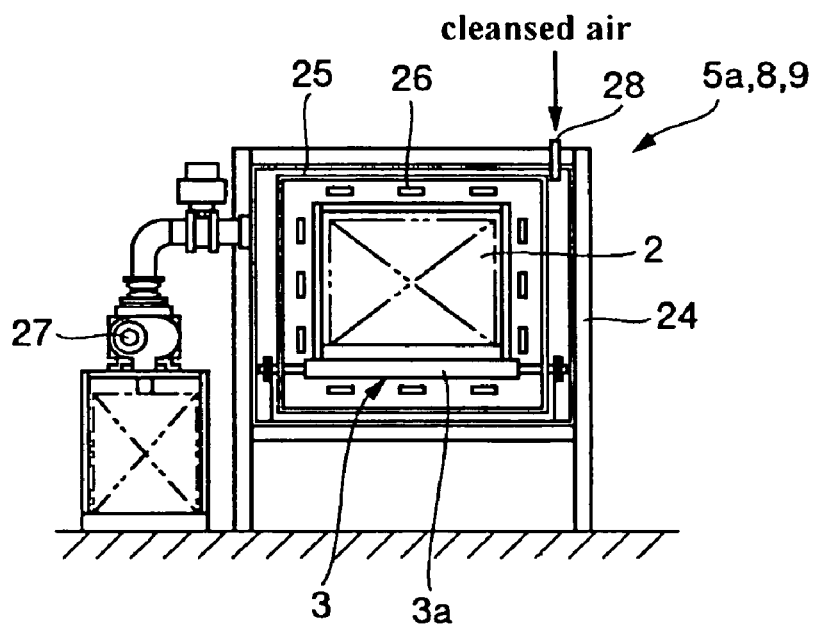
FIG. 3 is a cross section of the vacuum draw chamber and 1$^{st}$ and 2$^{nd}$ changeover chambers of the sealing process furnace shown in FIG. 1.

The following will describe, with reference to the attached drawings, selected, representative examples of the glass panel assembly sealing method and sealing process furnace. The glass panel sealing process furnace (hereafter referred to as "the furnace") 1, as described in FIGS. 1, 2, and 3, primarily comprises:

a transport mechanism 3 which transports a glass panel assembly (hereafter referred to as "glass panel") 2 formed from two mutually overlaid glass substrates between which a seal frit has been applied, a preliminary heating part in the form of a 1$^{st}$ forced flow heating chamber 4 in which a heating medium is forcibly flowed to heat the glass panel 2 to temperature T1 which is a temperature near that at which the seal frit begins to melt, a pressure reduction part in the form of a vacuum draw chamber 5 in which the pressure therein (pressure P1) is reduced while the preliminary temperature T1 is maintained, a sealing treatment part in the form of a 2$^{nd}$ forced flow heating chamber 6 in which the temperature of the glass panel 2 is raised from the preliminary temperature T1 to a sealing process temperature T2 while a forced flow of a heating medium is maintained therein, pa cooling part in the form of a forced flow cooling chamber 7 in which the temperature of the glass panel 2 is reduced through a forced flow of a cooling medium, and pressure adjustment parts, which are capable of both increasing and decreasing pressure, in the form of 1$^{st}$ and 2$^{nd}$ changeover chambers 8 and 9, the former being located between the 1$^{st}$ forced flow heating chamber 4 and the vacuum draw chamber 5, and the latter being located between the vacuum draw chamber 5 and the 2$^{nd}$ forced flow heating chamber 6. These chambers 4, 5, 6, 7 are disposed along a transport direction of the glass panel 2 by the transport mechanism 3. Temperature can be controlled independently in each of the chambers 4 through 9.

The glass panel 2 is constructed according to conventionally known methods. This example describes the sealing process furnace 1 as a roller hearth type continuous sealing process furnace in which the transport mechanism 3 is a roller hearth type transport mechanism which transports the glass panel 2 through furnace 1. Transport mechanism 3 continuously extends in the furnace 1 from the entrance end of the 1$^{st}$ forced flow heating chamber 4 to the exit end of the forced flow cooling chamber 7. Therefore, multiple glass panels 2, which have been individually placed on trays, are continuously sequentially transported, by transport mechanism 3, from the 1$^{st}$ forced flow heating chamber 4 to the forced flow cooling chamber 7.

1$^{st}$ forced flow heating chamber 4 is structured to include freely open and closable entrance door 10 at the entrance thereto, freely open and closable exit door 11 at the exit there from, and multiple compartments 4a defined by the formation of partition walls 12 along the traversing direction of the transport mechanism 3. The internal temperature of each multiple compartment 4a is controlled in relation to adjacent compartments 4a along the traversing direction of the transport mechanism 3. The internal temperature of the compartment 4a close to the exit side is set higher than that of the compartment 4a close to the entrance side in relation to adjacent compartments 4a. Therefore, the temperature of the glass panel 2 being transported through the 1$^{st}$ forced flow heating chamber 4 (by the transport mechanism 3) can be sequentially raised, within the region extending from the entrance door 10 to the exit door 11, from room temperature to the preliminary temperature T1 (e.g., 350° C.) which is a temperature slightly cooler than that at which the seal frit begins to melt and expel impure gas. Moreover, the coordinated temperature and pressure control maintains atmospheric pressure (P2) within the 1$^{st}$ forced flow heating chamber 4.

The following describes the structure of each compartment 4a in the 1$^{st}$ forced flow heating chamber 4. Each compartment 4a includes:

a furnace case 13, a thermal barrier 14 formed within the furnace case 13, a muffle 16 located within the thermal barrier 14 to define a channel 15 inner side of the thermal barrier 14 and surrounding the glass panels 2 supported and transported by the rollers 3a, a recirculation fan 17 located at the top of the furnace case 13 and forcefully circulating the internal thermal medium gas through the channel 15, a multi-orificed rectifier element 18 located between the glass panel 2 and the recirculation fan 17 within the muffle 16, a radiant tube burner 19 installed between the thermal barrier 14 and the muffle 16 with the purpose of heating the internal gas therein, a supply tube 20 which guides a flow of cleansed air into the compartment 4a, and an exhaust duct 21 through which the internal gas within the compartment 4a is evacuated.

Within each compartment 4a, the glass panel 2 is heated under approximately atmospheric pressure (P2) by the internal thermal medium gas. The internal gas is continuously supplied from supply tube 20 and evacuated to exhaust duct 21, is heated by the radiant tube burner 19 according to the heating process control and is forcefully circulated around the glass panel 2 through the channel 15 and rectifier element 18 by recirculation fan 17.

The vacuum draw chamber 5 is equipped with freely open and closable entry door 22 and exit door 23, each respectively located at the entry and exit side thereon, and contains multiple compartments 5a defined by the formation of partition walls 12 along the traversing direction of the transport mechanism 3. While the glass panel 2 is carried through the vacuum draw chamber 5 by the transport mechanism 3, preliminary temperature T1 is maintained therein and pressure (P1) is concurrently reduced, for example to an approximate pressure 1 Pa (Pascal), by means of a pressure control operating in coordination with the temperature control.

The following will describe the structure of each compartment 5a in the vacuum draw chamber 5. Each compartment 5a includes:

an external shell 24, a radiation shield 25 located within the external shell 24 and surrounding the glass panels 2 supported and transported by the rollers 3a, a heater 26 located within the radiation shield 25 to maintain preliminary temperature T1 around the glass panel 2, a vacuum draw unit 27 connected to the internal region of the external shell 24 as means of drawing a vacuum within the compartment 5a, and an gas supply duct 28 which is used to return atmospheric pressure (P2) to the compartment 5a, that is, vacuum draw chamber 5. Therefore, each compartment 5a is able to maintain glass panel 2 at the preliminary temperature T1 by means of the radiation shield 25 and heater 26 while a reduced pressure environment is concurrently created therein by means of vacuum draw unit 27.

Excluding the absence of an exit door leading to the forced flow cooling chamber 7, the structure of the $2^{nd}$ forced flow heating chamber 6 is essentially the same as that of the previously described $1^{st}$ forced flow heating chamber 4. Also, similar to the $1^{st}$ forced flow heating chamber 4, the temperature of the $2^{nd}$ forced flow heating chamber 6 is controlled by means that the temperature within each successive compartment 6a is successively increased along the traverse direction of the transport mechanism 3. Therefore, the glass panel 2 carried by transport mechanism 3 is subjected to a sequential heating process in the $2^{nd}$ forced flow heating chamber 6. This heating process continues to raise the temperature to the sealing process temperature T2, for example 450° C., at boundary portion B adjacent to the forced flow cooling chamber 7 from the preliminary temperature T1 at entrance door 29 of the $2^{nd}$ forced flow heating chamber 6. Moreover, the coordinated temperature and pressure control maintains atmospheric pressure (P2) within the $2^{nd}$ forced flow heating chamber 6. The structure of each compartment 6a in the $2^{nd}$ forced flow heating chamber 6 is essentially the same as that of compartments 4a in the $1^{st}$ forced flow heating chamber 4.

Excluding the absence of an entrance door being led from the $2^{nd}$ forced flow heating chamber 6, forced flow cooling chamber 7 has the same essential structure as that of the previously described $1^{st}$ forced flow heating chamber 4. The temperature within the forced flow cooling chamber 7 is controlled so that the temperature of each successive compartment 7a is sequentially cooler than that in the adjacent compartment 7a in the traverse direction of transport mechanism 3. Therefore, the glass panel 2 carried by transport mechanism 3 is subjected to a sequential cooling process in the forced flow cooling chamber 7. This cooling process continues to lower the temperature from the sealing process temperature T2 at aforementioned boundary portion B to an exiting temperature of 100° C., for example, at exit door 30. Furthermore, pressure control, which is coordinated with temperature control, is applied to also maintain atmospheric pressure (P2) within the forced flow cooling chamber 7.

The structure of each compartment 7a in the forced flow cooling chamber 7 is essentially the same as that of the $1^{st}$ forced flow heating chamber 4. Within each compartment 7a, the glass panel 2 is cooled under approximately atmospheric pressure (P2) by the internal cooling medium gas. The internal gas is continuously supplied from supply tube 20 and evacuated to exhaust duct 21, is heated by the radiant tube burner 19 according to the cooling process control and is forcefully circulated around the glass panel 2 through the rectifier element 18 by recirculation fan 17.

In order that the pressure control is able to adjust the pressure in the region among the $1^{st}$ forced flow heating chamber 4, the vacuum draw chamber 5, and the $2^{nd}$ forced flow heating chamber 6, the $1^{st}$ changeover chamber 8 is disposed between the $1^{st}$ forced flow heating chamber 4 and the vacuum draw chamber 5, and the $2^{nd}$ changeover chamber 9 is disposed between the vacuum draw chamber 5 and the $2^{nd}$ forced flow heating chamber 6, since the chambers 4, 5, and 6 are sequentially disposed in the direction of traverse of the glass panel 2 carried by the transport mechanism 3. The $1^{st}$ and $2^{nd}$ changeover chambers 8 and 9, each of which has a structure similar to that of the vacuum draw chamber 5, are respectively equipped with entry doors 31 and 32 and exit doors 33 and 34. When the glass panel 2 enters the vacuum draw chamber 5, the pressure within the $1^{st}$ changeover chamber 8 is reduced to pressure (P1) by vacuum draw unit 27, and returned to atmospheric pressure (P2), by means of gas introduced from gas supply duct 28, when the glass panel 2 exits the $1^{st}$ forced flow heating chamber 4. Moreover, when the glass panel 2 exits the vacuum draw chamber 5, the pressure within the $2^{nd}$ changeover chamber 9 is decreased to pressure (P1) by means of the vacuum draw unit 27, and returned to atmospheric pressure (P2), by the introduction of gas from gas supply duct 28, when the glass panel 2 enters the $2^{nd}$ forced flow heating chamber 6.

The following will explain the glass panel assembly sealing method with reference to this example. Glass panel 2, which comprises two mutually overlaid glass substrates between which a seal frit has been applied, is sequentially transported by transport mechanism 3 from the entrance end of the 1st forced flow heating chamber 4 to the exit end of the forced flow cooling chamber 7 through the sealing process furnace 1.

First, entrance door 10 of the 1st forced flow heating chamber 4 is opened, the glass panels 2 individually loaded onto trays are inserted into the chamber 4, and the door 10 is closed. The glass panels 2 are then transported into the 1st forced flow heating chamber 4, by the transport mechanism 3, under atmospheric pressure (P2), and heated while passing through a sequentially higher temperature environment in each compartment 4a until preliminary temperature T1 is attained. The temperature T1 is a temperature slightly lower than that at which the seal frit begins to melt and impure gas is released. The processing time of the preliminary heating for the glass panel 2 is set a transfer speed of the transport mechanism 3 and a distance between a point where the glass panel 2 attains temperature T1 and a position of the exit door 11 of the 1st forced flow heating chamber 4.

During this heating process, the internal gas, in the form of a thermal medium, is forcibly circulated through the compartments 4a by the recirculation fan 17, so that the internal gas can evenly control the rise in temperature of the glass panel 2 to the control temperature in each compartment 4a of the 1st forced flow heating chamber 4. Heating the glass panel 2 up to the preliminary temperature T1 within an environment controlled to atmospheric pressure (P2) results in the release of residual impure gas, such as cracked gas, which has adhered to the uneven surface of the seal frit and/or has remained in the porous thereof. Furthermore, impure gas is not only released from the seal frit, but also from electrodes, inductive material, fluorescent material, and baked portions, such as the partition walls.

When the glass panel 2 reaches the exiting end of the 1st forced flow heating chamber 4, exit door 11 of the 1st forced flow heating chamber 4 opens, entry door 31 of the 1st changeover chamber 8 opens, the glass panel 2 traverses to and enters the 1st changeover chamber 8, and doors 11 and 31 close. At this time, atmospheric pressure (P2) is maintained within the 1st changeover chamber 8. The pressure within the 1st changeover chamber 8 is then decreased to pressure (P1) through the operation of the vacuum draw unit 27, pressure (P1) being approximately the same as the pressure within the vacuum draw chamber 5.

Once the pressure has been reduced, a sequential process begins in which exit door 33 of the 1st changeover chamber 8 opens, entry door 22 of the vacuum draw chamber 5 opens, the glass panel 2 is transported into the vacuum draw chamber 5, and doors 22 and 33 close. During the time that it takes for the transport mechanism 3 to carry the glass panel 2 through the length of the vacuum draw chamber 5, the temperature is maintained at the preliminary temperature T1 by the operation of the radiation shield 25 and heater 26, and reduced pressure (P1) is maintained by the vacuum draw unit 27. This process, by which the reduced pressure condition is kept by the exhaust operation for a sufficient time while the preliminary temperature T1 is concurrently maintained, results in that the residual impure gas, air and the like, which were released and remaining within the glass panels 2 by the process in the 1st forced flow heating chamber 4, are forcefully removed.

When the glass panel 2 reaches the exit end of the vacuum draw chamber 5, a sequence process initiates in which the exit door 23 of the vacuum draw chamber 5 opens, the entry door 32 of the 2nd changeover chamber 9 opens, the glass panel 2 traverses into the 2nd changeover chamber 9, and doors 23 and 32 close. At this time, the pressure within the 2nd changeover chamber 9 is reduced to a pressure (P1) which is approximately equivalent to that in the vacuum draw chamber 5. The pressure within the 2nd changeover chamber 9 is then increased to atmospheric pressure (P2) by means of the flow of gas therein through the gas supply duct 28, pressure (P2) being approximately equivalent to that within the 2nd forced flow heating chamber 6.

Once the pressurization operation is complete, exit door 34 of the 2nd changeover chamber 9 opens, entrance door 29 of the 2nd forced flow heating chamber 6 opens, the glass panel 2 is transported into the 2nd forced flow heating chamber 6, and doors 29 and 34 close. The glass panel 2 is then transported into the 2nd forced flow heating chamber 6, by the transport mechanism 3, and heated while passing through a sequentially higher temperature environment in each compartment 6a until the sealing process temperature T2 is attained under atmospheric pressure (P2). The processing time to maintain the seal process temperature T2 to the glass panel 2 is set a transfer speed of the transport mechanism 3 and a distance between a point where the glass panel 2 attains temperature T2 and the exit end (which is the boundary point B at the forced flow cooling chamber 7) of the 2nd forced flow heating chamber 6. Similar to the process which occurred in the 1st forced flow heating chamber 4, this process makes it possible to evenly control the rise in temperature of the glass panel 2 to the control temperature in each compartment 6a.

Heating the glass panel 2 up to the sealing process temperature T2 under atmospheric pressure (P2) enables the seal frit to be melted and seal the glass substrates against each other. When this sealing process is executed, most of the impure gas has already been removed from the glass panel 2 through the previously applied heating process in which the panel was heated to the preliminary temperature T1 and exhaust process. If impure gas was released, it would be a small amount. This makes it possible to reduce subsequent gas evacuation operations applied to the glass panel 2 and to improve light emitting performance of a plasma display panel (PDP).

After being transported through the 2nd forced flow heating chamber 6, the glass panel 2 is sequentially cooled, during its continuing traverse by means of transport mechanism 3, as it passes through each compartment 7a of the forced flow cooling chamber 7 under controlled atmospheric pressure (P2). Similar to the process which occurred in the 1st forced flow heating chamber 4, this process makes it possible to uniformly control the drop in temperature of the glass panel 2 to the control temperature in each compartment 7a. Therefore, when the glass panel 2 reaches the exit end of the forced flow cooling chamber 7, the exit door 30 opens, and subsequently closes after the glass panel 2 is transported out of the sealing process furnace 1. The above-described sealing process is executed, as the glass panel 2 is continually transported by the transport mechanism 3, through the sealing process furnace 1, as each of the entry doors 10, 22, 29, 31 and 32, and each of the exit doors 11, 23, 30, 33 and 34 open and close in coordinated sequence to accommodate the passage of the glass panel 2 therethrough.

The method of sealing glass panel assembly and sealing process furnace as described herein have the gas evacuation process and gas evacuation part reducing internal pressure within the furnace to a pressure (P1) at preliminary temperature T1 which is appropriately selected during the heating process to raise a temperature to the sealing process temperature of seal frit. The coordinated control of pressure and temperature makes it possible to properly remove impure gas and the like from a glass panel assembly 2. A glass panel assembly 2 sealed through this method and furnace thus contains a reduced amount of residual impure gas.

While we have described the glass panel assembly 2 as a plasma display panel, other types of multiple layer vacuum insulated glass panel assemblies are within the spirit, intent and scope of this disclosure. Moreover, the transport mechanism 3 is not limited to a roller hearth type transport mechanism as previously described, but may also be structured as a cart or other type transport mechanism.

The invention claimed is:

1. A method of sealing a glass panel assembly by melting a seal frit which is applied between two mutually overlaid glass substrates, comprising:
   a preliminary heat process where temperature of the glass panel assembly is increased to a preliminary temperature within a forced flow of a heating medium, the preliminary temperature being lower than a temperature at which the seal frit begins to melt,
   a pressure reduction process where pressure surrounding the glass panel assembly is reduced while the preliminary temperature is maintained,
   a sealing process where temperature of the glass panel assembly is raised from the preliminary temperature to a sealing process temperature within a forced flow of a heating medium, and
   a cooling process where the glass panel assembly is cooled within a forced flow of a cooling medium.

2. A glass panel assembly sealing process furnace incorporating a transport mechanism as means of transporting a glass panel assembly therethrough and melting a seal frit which is applied between two mutually overlaid glass substrates of the glass panel assembly, comprising:
   a preliminary heating portion, a pressure reduction portion, a sealing treatment portion and a cooling portion sequentially disposed along a transport direction of the glass panel assembly by the transport mechanism, and
   pressure adjustment portions capable of increasing and decreasing pressure, installed between the preliminary heating portion and the pressure reduction portion, and also between portion pressure reduction portion and the sealing treatment portion, wherein
   the preliminary heating portion heats the glass panel assembly with a forced flow of a heating medium to a preliminary temperature, the preliminary temperature being lower than a temperature at which the seal frit begins to melt,
   the pressure reduction portion decreases pressure surrounding the glass panel assembly and maintains the preliminary temperature,
   the sealing treatment portion heats the glass panel assembly with a forced flow of a heating medium to a sealing process temperature from the preliminary temperature, and
   the cooling portion cools the glass panel assembly with a forced flow of a cooling medium.

* * * * *

UNITED STATES PATENT AND TRADEMARK OFFICE
CERTIFICATE OF CORRECTION

| | | |
|---|---|---|
| PATENT NO. | : 7,625,260 B2 | Page 1 of 1 |
| APPLICATION NO. | : 10/589914 | |
| DATED | : December 1, 2009 | |
| INVENTOR(S) | : Kisoda et al. | |

It is certified that error appears in the above-identified patent and that said Letters Patent is hereby corrected as shown below:

In Column 4

At line 16, after "therein," please change "change "pa" to --a--.

Signed and Sealed this

Thirtieth Day of March, 2010

David J. Kappos
*Director of the United States Patent and Trademark Office*